United States Patent Office 3,196,864
Patented July 27, 1965

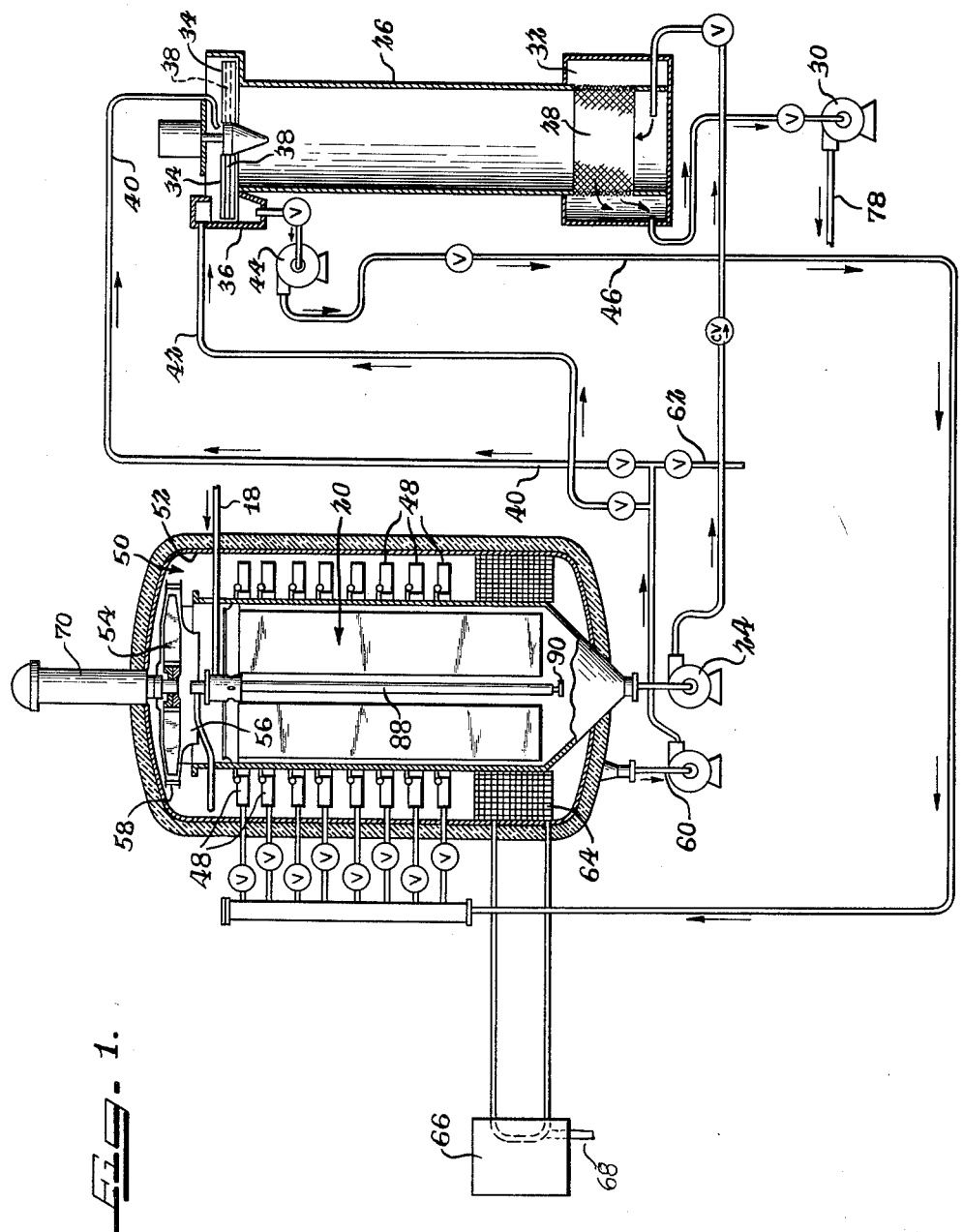

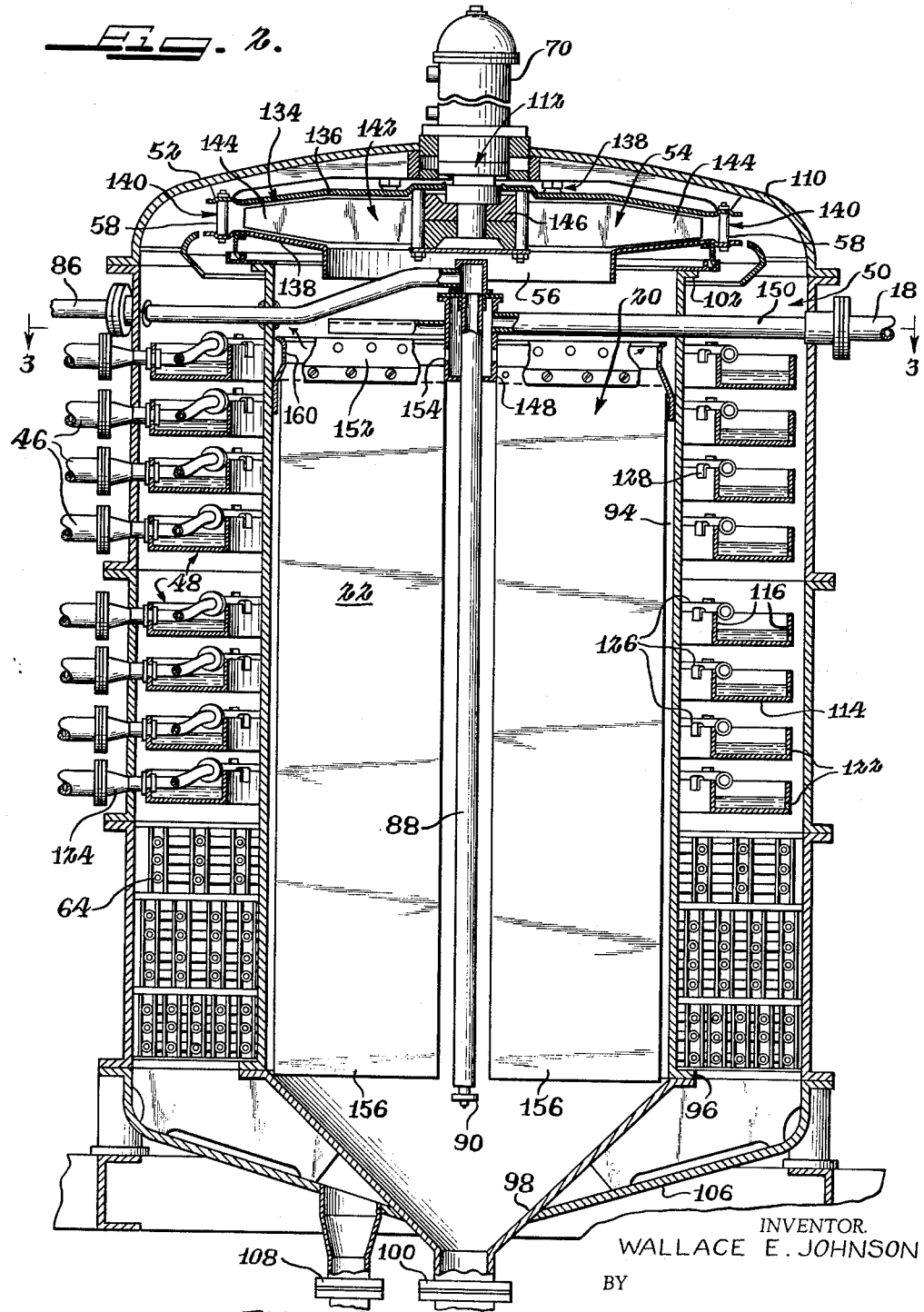

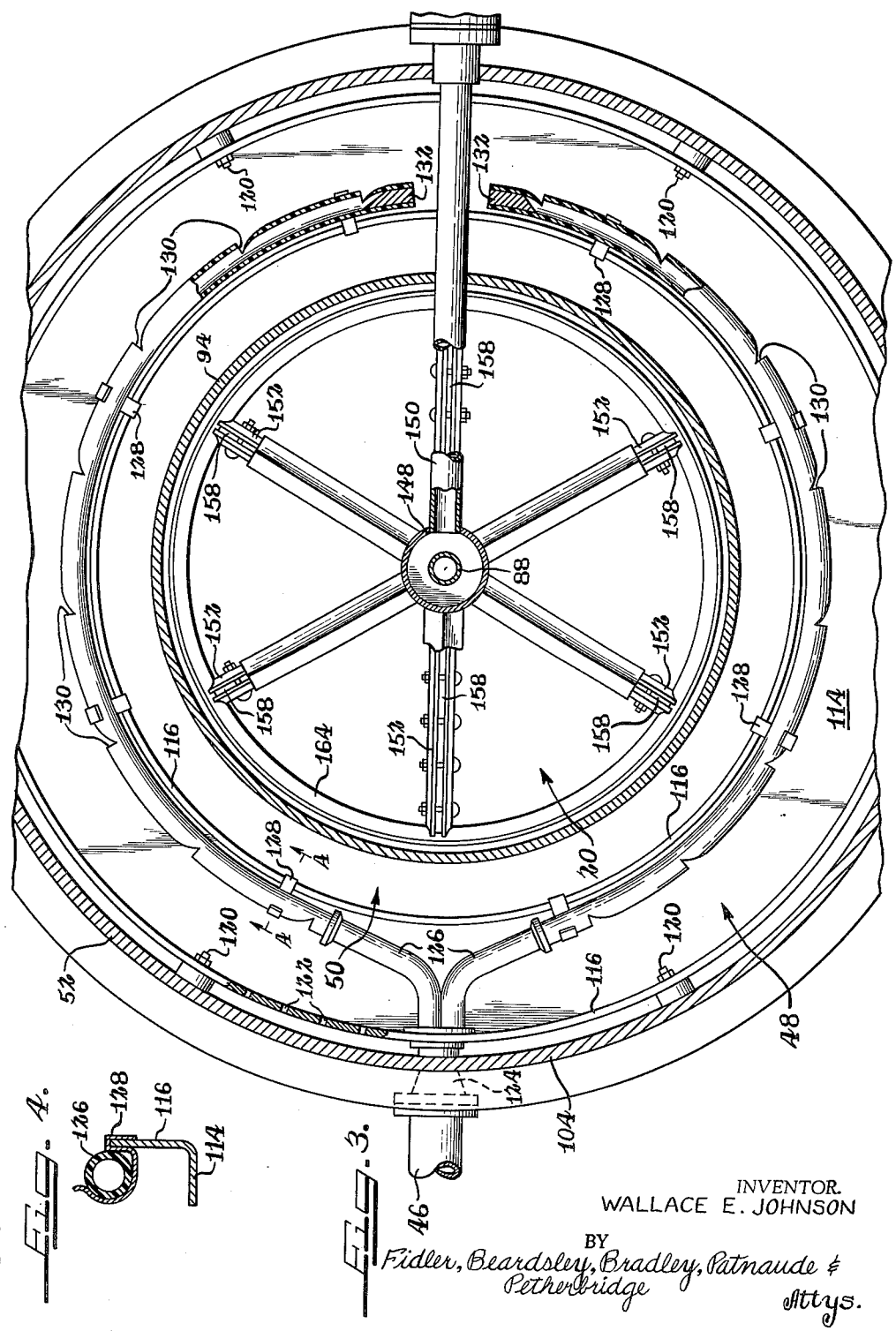

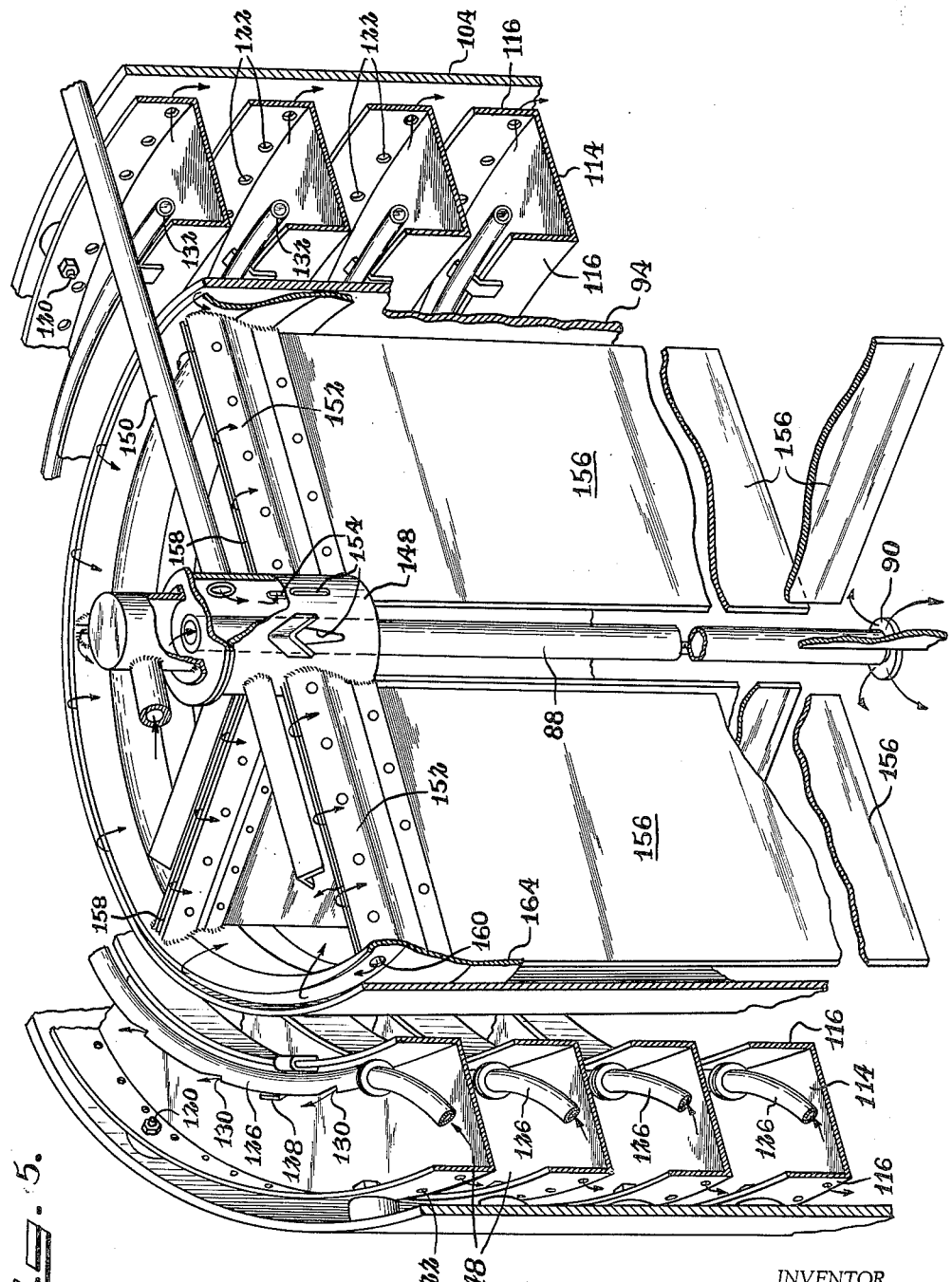

3,196,864
CONDENSING CHAMBER APPARATUS
Wallace E. Johnson, Beloit, Wis., assignor to Desalination Plants Limited, Tel Aviv, Israel, a limited company of Israel
Original application Apr. 14, 1961, Ser. No. 103,112. Divided and this application Apr. 29, 1963, Ser. No. 276,508
16 Claims. (Cl. 126—343.5)

This application is a divisional application of my copending application, Serial No. 103,112, filed April 14, 1961.

This invention relates to apparatus for separating a solute in substantially pure form from solutions and more particularly relates to condensing chamber apparatus for such systems.

The apparatus of the present invention is hereinafter described in connection with a system for producing sweet water from sea water, but it must be appreciated that the inventions are capable of application to other fields. While in the case of producing "sweet" water from sea water the primary product is "sweet" water, in other applications of the apparatus, such as in dehydrating citrus fruit juices, the primary final product may be the concentrated remaining solution after removal of the solute, and the pure solute removed may or may not be of importance as a secondary product. Since the system hereinafter described is principally for desalting sea water, the expression "desalination" is used hereafter in identifying the system, but it must be appreciated that this term is meant to include the various other applications of the system wherein a solute is to be separated from a solution.

One of the most serious and ever-present problems in many areas of the world today is the lack of fresh water. Many of these areas have a depressed standard of living, due directly to the lack of fresh water in substantial quantities. And yet ironically enough, many of these areas are bounded by substantial bodies of sea water which, due to its salt content, is neither useful for human consumption nor for irrigation.

The problem of converting sea water to potable water has long been known, and the solution has been pursued by many people over many years. There have been numerous methods proposed and operated that will produce potable water from sea water, and, in fact, there are several systems in operation today. These systems, however, have only enjoyed limited success because they could not produce potable water in sufficient volume and at a reasonable cost, the cost being considered from the standpoint of equipment cost, maintenance, and/or the energy input requirements for the system. Not only must a desalination system be able to produce large volumes of potable water, but the cost is of extremely great importance. As previously pointed out, in the substandard areas of the world, this problem is most pressing, and high cost of equipment, maintenance, and operation would be most severely felt in such areas.

A great deal of attention has been given to this problem in recent years and has resulted in a vacuum-freezing system for producing sweet water, that is basically sound in principle. However, that system has fallen short of success because the method, system, and apparatus used and proposed failed to result in a system that would desalt large volumes of sea water economically. Economy of equipment, cost, and operation cannot be overemphasized and, simply stated, if the system is not economical, it fails.

As the result of intensive work, my associates and I have developed methods, systems, and apparatus for desalination which economically produce large volumes of sweet water, and these are the subject of copending U.S. patent application, Serial No. 103,114, filed April 14, 1961, for Methods, Systems, and Apparatus for Separating a Solute in Substantially Pure Form From Solutions, the disclosure of which relates to a desalination system and to the construction and arrangement of the evaporating and condensing chambers. As disclosed in the copending application, sea water is flash-evaporated in an evaporating chamber, forming pure water vapor, pure ice, and concentrated brine, and in the condensing chamber the pure water vapor and ice are brought together to condense the vapor and simultaneously melt the ice to produce the final sweet-water product. Generally speaking, the evaporating and condensing chamber apparatus of said copending application consists of a cylindrical evaporating tank which has an inlet for supplying precooled sea water; a concentric coaxial condensing tank larger than and surrounding the evaporating tank, to provide a condensing chamber between the walls of the tanks; inlets into the condensing chamber for admitting ice and vapor; and apparatus within the condensing chamber to provide sufficient contact between the vapor and ice for effective condensation and melting.

An object of the invention is to provide condensing chamber apparatus which is economical in cost and efficient in operation.

A further object of the invention is to provide efficient and economical condensing chamber apparatus in which heat losses and cost of preventing heat losses are reduced to a minimum.

A still further object of the invention is to provide efficient, economical condensing chamber apparatus which is relatively inexpensive to construct with less material due to the arrangement thereof.

A further object of the invention is to provide condensing chamber apparatus achieving the above objects and which includes apparatus for providing ample surface contact between the vapor and ice in the condensing chamber.

These and other objects and advantages will become more readily apparent as this description proceeds and is read in conjunction with the accompanying drawings in which:

FIG. 1 is a preferred form of a compressor, evaporating and condensing chamber arrangement employing a condensing chamber assembly constructed in accordance with the present invention;

FIG. 2 is an elevational view in section, showing in detail the construction and arrangement of an embodiment of a condensing chamber assembly constructed in accordance with the principles of the present invention;

FIG. 3 is a plan view in section taken on line 3—3 of FIG. 2;

FIG. 4 is a detail sectional view taken on line 4—4 of FIG. 3, and

FIG. 5 is a partial perspective view showing the evaporating chamber, the apparatus for distributing sea water in the evaporating chamber, the condensing chamber and ice-distributing trays for the condensing chamber.

*General description of the system*

Although the present invention has a variety of applications, a suitable application therefor is in a desalination system for making potable or fresh water from sea water, such as the desalination system disclosed in the copending application, Serial No. 103,114, the disclosure of which is hereby incorporated herein by reference.

The general arrangement of the desalination system disclosed in the above-mentioned copending application will be first described.

Sea water which is at ambient temperature, and which has been filtered to remove solid material and then deaerated is delivered by pump means (not shown) through heat exchange means (not shown) to a flash evaporating chamber 20 wherein a portion of the water is converted to ice and vapor. Sea water entering the system will be normally at ambient temperature, such as, for example, 77° F., and normally contains about 3.5% by weight of salt.

The sea water leaving the heat exchange means will normally be at a temperature of approximately 30.2° F. and is delivered through pipe 18 into the evaporating chamber 20. The sea water enters the evaporating chamber and flows downwardly therein.

The interior of the evaporating chamber 20 is maintained at a low pressure, approximately 3.2 mm. Hg (millimeters of mercury) by a vacuum pump (not shown). Due to the fact that the interior of the evaporating chamber is at such low pressure, sea water will flash evaporate therein to form ice and vapor. At the freezing temperature of sea water, the heat of evaporation is approximately 1074 B.t.u. per pound and the heat of fusion of ice is about 144 B.t.u. per pound. As vapor is produced by evaporation, heat is removed from the remaining liquid, and ice is formed therein. Due to the differences in heat of vaporization and heat of fusion, approximately 7½ pounds of ice will be produced for each pound of water vapor. The ice so produced is substantially pure water ice with no appreciable amount of salt therein. When continuous operation is established, the temperature within the evaporating chamber will be approximately 24.8° F. The vapor formed will be pure water vapor. Thus, upon removal of the pure water from the incoming sea water by the vaporization and freezing process, the remaining sea water becomes a more concentrated salt solution.

The evaporation of water, with the consequent formation of vapor and ice, is a function of time since heat must be transferred, and also the rate of evaporation is proportional to surface area.

The brine, with the ice crystals therein, is withdrawn from the bottom of the evaporating chamber 20 through a pump 24 and this mixture of ice and brine has a temperature of approximately 24.8° F. The mixture is delivered to a separator washer or counter-washer 26, in which the ice is separated from the concentrated brine and the ice is washed free of salt adhering to the surfaces of the ice crystals. The ice-brine mixture enters the lower end of the separator-washer under pressure, and the column of the separator-washer becomes essentially full of ice crystals. The pressure exerted by the entrance of the brine at the bottom of the counter-washer forces the cylinder of ice packed therein upwardly, and thus brine forces its way through the ice pack, out through screens 28. A pump 30 removes the brine from a jacket 32 around the lower end of the counter-washer. The pressure drop, created by forcing brine through the ice pack within the column exerts a force on the column of packed ice, moving it upwardly. Thus, the ice column within the counter-washer continuously moves upwardly. At the upper end of the counter-washer is a motor-driven scraper or wiper 34 which wipes off the top of the upwardly moving column of ice and delivers the ice into trough 36. Spray heads 38 are provided at the top of counter-washer 26 for spraying "sweet water" supplied by pipe 40 onto the top of the porous column of ice, which water runs downwardly over the advancing column of ice to wash away any adhering brine on the surface or in the interstices of the ice.

"Sweet water" is added by means of pipe 42 to the ice and trough 36. By supplying "sweet water" to the ice to provide a liquid with the ice suspended therein, the resulting slurry may be more readily handled, and the liquid prevents the breaking of the vacuum within the vacuum chamber.

Ice-sweet water pump 44 is shown for delivering the slurry of ice and sweet water from the trough 36 through a pipe 46 to a plurality of trays 48 arranged concentrically within a condensing chamber 50.

Condensing chamber 50 is an annular chamber, having its inner dimension defined by the wall of the concentric evaporating chamber 20 and its outer dimension defined by the outer wall 52, which preferably is insulated, as indicated in FIG. 1, to prevent heat from entering the distribution system.

A radial compressor 54 is positioned within the upper end of condensing chamber 50 and has an axial intake opening 56 in communication with evaporating chamber 20 and a circular outlet 58 communicating with condensing chamber 50. A motor 70 for driving the compressor is located outside the condensing chamber so that it will not introduce heat into the desalination system.

Vapor formed in evaporating chamber 20 is drawn into central inlet 56 of compressor 54 and delivered radially outward into condensing chamber 50 through outlet 58. The vapor is thus compressed, and compressor 54 maintains condensing chamber 50 at a pressure of approximately 4.6 mm. Hg. The vapor delivered by the compressor into the condensing chamber passes downwardly into contact with the ice disposed in trays 48 and simultaneously causes the vapor to condense and ice to melt. The "sweet" water thus produced is withdrawn from the lower end of condensing chamber 50 through pipe 60, which delivers a portion of the "sweet" water back to counter-washer 26 through pipes 40 and 42 for ice washing and for mixing with the ice. The majority of the "sweet" water product passes through pipe 62 to heat exchange means (not shown).

Ideally, the vapor should be delivered to the evaporating chamber at saturation conditions of pressure and temperature, so that the vapor will condense on the 32° F. ice, and the ice will take out of the vapor 1,074 B.t.u. per pound of vapor condensed and thereby cause the 32° F. ice to melt by each pound absorbing 144 B.t.u. However, due to losses because of heat entering the system and superheating of the vapor, refrigeration means, such as, for example, secondary refrigeration coils 64, may be provided in condensing chamber 50. These coils condense enough vapor to provide thermal balance in the process. The coils 64 are cooled by a conventional refrigeration unit 66 in which sea water, tapped from the sea water inlet (not shown) may be circulated and then discharged through waste outlet 68.

As previously described, the final product, potable water, is delivered from condensing chamber 50 through pipe 62 and is at a temperature of approximately 32° F. The concentrated brine which has been separated from the ice in counter-washer 26 is delivered via pump 30 to the heat exchange means (not shown) through pipe 78 and is at a temperature of approximately 24.8° F.

As previously mentioned, the principal product of the system described is potable water, but, of course, it will be readily appreciated that the concentrated brine could be used for further processing to produce salt, or, if other raw products such as fruit juices were initially supplied to the system, the concentrated fruit juice delivered from the heat exchanger would be the principal product and the potable water would be a useful by-product.

It should be noted that a higher pressure is necessary in the condensing chamber than in the evaporating chamber because the vapor pressure of the freezing brine is lower than the vapor pressure of the ice-water mixture at 32° F. The vapor pressure of brine of 7% by weight salinity at 24.8° F. is about 3.2 mm. Hg, while the vapor pressure of ice-water mixture at 32° F. is about 4.6 mm. Hg. The compressor maintains this condition.

In any commercially successful desalination system, relatively large volumes of potable water must be produced, and, while this may be effected by building larger and larger equipment, again, within shadow of commercial unacceptance due to high cost, the size of the equipment must be reasonable. With the system, schematically shown in FIG. 1, it is contemplated that approximately 60,000 gallons of potable water per 24-hour day would be produced. Rather than attempt to increase the size of the equipment and thereby add to its expense out of proportion to gain, it is contemplated that when larger production of potable water is required, which will normally be the case, separate but parallel systems will be installed and operated to supply additional requirements.

*Condensing chamber construction*

Referring to FIGS. 2–5, the condensing chamber assembly is shown in greater detail.

The details of the evaporating chamber 20 will first be described and the details of the relationship thereof with the construction of the condensing chamber thereafter described.

Evaporating chamber 20 comprises a cylindrical wall 94 which terminates at its lower end in an outwardly directed flange 96. Secured to flange 96 and extending downwardly therefrom is a conical drain 98 which is provided at its lower end with pipe fitting 100 for connection to the conventional piping of the system. The upper end of wall 94 also terminates in a flange 102 which the compressor 54 engages.

Disposed within chamber 20 is distributor 22 having connections through the wall of chamber 20 with brine pipe 86 and incoming sea water pipe 18. Chamber 20 is a closed chamber, except for the discharge opening at the bottom and communication with the compressor at the top. A pressure of about 3.2 mm. Hg is maintained in the chamber by the compressor in conjunction with a vacuum pump not shown connected to condensing chamber 50.

The condensing chamber assembly includes the chamber 50, the inner confines of which are provided by the cylindrical wall 94, and the outer confines of which are defined by a cylindrical wall 104. This wall 104 may be constructed of a series of sections, but is a closed, airtight vessel. Secured at the bottom of cylindrical wall 104 is a conical drain portion 106 which communicates with a pipe fitting 108, the latter affording connection to the piping of the system.

At the upper end of wall 104 is a cover member 110 secured thereto, and this cover member spans the top of chambers 20 and 50. The drive mechanism between compressor motor 70 and compressor 54 extends through cover 110 and is indicated generally at 112. Condensing chamber 50 is a closed and air-tight vessel, and it is maintained at a pressure of approximately 4.6 mm. Hg by vacuum pump connected in the region of refrigeration coils 64. The only points of communication with chamber 50 are at drain portion 106, circular outlet 58 of compressor 54, connections to pipe 46 which supplies ice to trays 48, and the vacuum pump connection (not shown).

As seen in FIGS. 2, 3, and 5, a plurality of annular trays 48 are provided within condensing chamber 50. These trays are upwardly facing U-shaped channel sections having a bottom wall 114 and upwardly facing side walls 116. The annular trays are supported by means of studs 120 carried by cylindrical wall 104 of the condensing chamber. It will be noted that trays 48 are spaced from both cylindrical walls 94 and 104 so that vapor may pass downwardly between these walls and the sides of the trays. The outer wall 116 of each tray is provided with a series of bores 122 through which "sweet" water can drain from the trays.

As best seen in FIG. 2, each tray 48 has associated therewith a pipe connection 124, through which ice-sweet water mixture from the counter-washer is supplied to the trays. Secured at the inner end of connection 124 are two semi-circular plastic pipe sections 126 with each extending substantially halfway around the inner wall 116 of trays 48. Plastic pipes 126 are held in place on inner wall 116 of the tray by means of spring clips 128, a detail sectional view thereof being shown in FIG. 4. At spaced intervals along this length, pipes 126 are provided with notches 130, the shape of which may best be understood by referring to the right-hand side of FIG. 3. The ends of plastic pipes 126 are closed by plugs 132.

Thus, an ice-water mixture will be forced under pressure into pipes 126 through pipe connection 124 and will be distributed about perimeter of trays 48 through notches 130. Each of the notches faces against the current of flow within pipes 126 and will cause portions of the mixture to be delivered through each notch. It is important that the greatest surface area possible of the ice be exposed to the vapor since the condensing of the vapor on the ice and the heat exchange relationship that takes place between the vapor and ice is a surface phenomenon. By this arrangement, the ice crystals are spread out throughout the extent of the trays 48.

The "sweet" water in the ice-water mixture will pass through discharge bores 122 in the outer wall of the trays, and the water will fall downwardly into the bottom drain portion 106 of the condensing chamber. Also, the potable water produced by condensation of the vapor on the ice in the trays and produced by the melting of the ice in the trays will be similarly discharged from the trays.

As previously mentioned, there are some inefficiencies in the system, and some heat may enter the system. Therefore, to provide a thermal balance and allow the process to proceed on a continuous basis, heat must be removed from the system. This heat removal may be accomplished in a number of ways, such as for example, by conventional refrigeration unit 66, as shown in FIG. 1, which has its cold coils 64 disposed within condensing chamber 50 at the lower end thereof, as best seen in FIG. 2. These coils are spaced apart so that vapor may pass thereover. The ice in trays 48 serves as the primary low heat sink to cause condensation of the vapor. Vapor may not be allowed to build up in the condensing chamber; otherwise, the system will be stalled, and all of the vapor must be condensed on a continuous basis. Cold refrigeration coils 64 serve as an additional low heat sink to insure that all vapor will be condensed. Also, it is important to note here that coils 64 are located near the lower end of condensing chamber 50 so that only such vapor that has passed over the ice in trays 48 will contact these coils and be condensed thereby. Such vapor will form a layer of ice on the coils until a condition of equilibrium is established beyond which additional condensation results in the formation of water which drains from the coils. Thus, only the heat of excess vapors is removed, while the accumulation of ice on the coils acts as a reservoir to accommodate excess vapor fluctuations in the system. While the vacuum pump and its connection to condensing chamber 50 are not shown, it should be noted that the suction side of the vacuum pump is connected to chamber 50 in the zone thereof or immediately below evaporator coils 64. Thus, since coils 64 remove the excess condensable vapors, the vacuum pump functions only to remove non-condensables, i.e., air. Consequently, the required vacuum pump may be of a relatively small size and there is no necessity for a cold trap in the vacuum pump connection to chamber 20.

By referring to FIG. 2, it will be seen that compressor 54 is disposed within the outer housing of the condensing-evaporating chambers. In the particular embodiment, the compressor is disposed immediately below cover 110 of chamber 50 and above cylindrical walls 94 of evaporating chamber 20. The compressor is actually supported by this cover and comprises a housing or shroud 134, having a top housing 136 and a lower housing or shroud 138, which are secured together but spaced apart around the periphery of the compressor by attachment means 140. Bottom shroud 138 is provided with the previously mentioned central inlet 56, and the annular space between the top and bottom shrouds, extending completely around the compressor, provides the circular outlet 58 previously identified. Shrouds 136 and 138 are so sealed to the walls of the chambers that the only communication between the chambers is through central inlet 56, the interior of the compressor, and circular outlet 58. Mounted within housing 134 is a rotating impeller 142, and it is important to note that this impeller is supported in a bearing by the top cover 110 of condensing chamber 50. The housing 134 does not journal or support the impeller 142, and the housing is a lightweight shroud fully supported by cover 110, which with wall 104 is the effective support and heavy-duty housing for the compressor. As seen in the drawings, the shroud or housing 134 is of thin, light construction. Impeller 142 comprises a plurality of radially extending blades 144 and central hub 146 and is rotated by motor 70 within housing 134. It must be appreciated that, in order to move the volume of vapor required, this compressor is large and rotates at a relatively high speed. For example, the diameter of impeller 142 will be approximately 7 feet, and the speed of rotation will be 3,600 r.p.m. For such speed of rotation and size of impeller, it is, therefore, most important that strong and ample support be provided for the driving shaft. Since cover 110 is a substantial structural member, it is able to afford the necessary support and provide a primary housing while the actual shroud or covering for the impeller is of relatively light material. In essence, the chamber into which the compressor is discharging serves here as the housing for the compressor and support for the drive.

The distributor comprises an upper central hollow manifold 148, which has a pipe 150 connected thereto, through which the incoming mixture of sea water and concentrated brine is supplied. Extending outwardly from manifold 148 is a series of upwardly opening conduits 152 (see FIG. 5), and incoming sea water enters these conduits through manifold ports 154. Depending therefrom are sheetlike members or plates 156, formed from suitable corrosion-resistant thin sheet stock, such as stainless steel or plastic. These plates present large surface areas. At the top of conduits 152 are elongated discharge openings or ports 158.

Thus, the incoming sea water enters manifold 148, passes through manifold ports 154 into conduits 152, and overflows therefrom through elongated opening 158. Liquid thus discharged flows downwardly by gravity over plates 156 and is distributed over their large surfaces in a relatively thin film to give maximum surface exposure of the liquid in the evaporating chamber. Also, to increase surface exposure, ports 160 are provided at the ends of conduits 152 through ring support 164, so that water flows through these ports into contact with the inside of cylindrical wall 94 and flows by gravity downwardly along this wall.

It is necessary to have maximum freezing exposure of the raw liquid within the freezing region without increasing the size and cost of equipment. Also, evaporation is a function of time, as well as surface area, and the time of travel required for the sea water to flow down the entire length of sheets 156 is sufficient to allow 50% conversion to "sweet" water vapor and ice.

From the foregoing it will be seen that the evaporating and condensing chambers are concentric chambers with one formed within the other. This affords several important advantages, and, when the importance of economy is borne in mind, this arrangement offers substantial savings in material and in operating costs. Additionally, compactness of the equipment results, and of great importance is the thermal efficiency possible.

Since the chambers are arranged, one within the other, there is no necessity for applying insulating material to the inner chamber, and the inner chamber is effectively insulated against entrance of external heat by the surrounding cold chamber. Evaporating chamber 20 has an ambient temperature of approximately 24.8° F., while the ambient temperature in the condensing chamber is approximately 32° F., and this small temperature differential will greatly limit the amount of heat being transferred into the evaporating chamber. It must be appreciated that these chambers are large tanks, and, if the concentric arrangement were not used, many square feet of tank surface would be additionally exposed to the atmosphere with the attendant opportunities for heat to enter the system, and these large surfaces would have to be insulated at substantial expense to limit as much as possible such heat entrance.

The evaporating and condensing chambers operate at a relatively low pressure, and the difference in pressure between the two chambers, 3.2 mm. Hg compared to 4.6 mm. Hg, is relatively small. Since these chambers are at such low pressures, great force will be exerted by the atmosphere on the tanks, tending to push them inwardly, and the tank wall construction must be sufficiently heavy to withstand this force, which amounts to many tons of force due to the large size of the tanks. The outside tank of condensing chamber 50 is of such heavy construction and has insulation material shown thereon in FIG. 1 of the drawings. However, with the arrangement of this invention, the walls of inner evaporating chamber 20 do not have to support any substantial loads, because the pressure differential across the wall is quite small. Therefore, it not only eliminates the necessity of insulating this inner chamber wall, but it may be of lightweight material and, therefore, less expensive material.

Problems of corrosion are not nearly as great in a freezing system as compared to conventional systems wherein salt water is heated, but it is nonetheless advisable to make the evaporating and condensing chambers of corrosion-resistant materials or materials with protective coatings to minimize corrosion problems.

This application describes a preferred embodiment of the invention in connection with a system for producing potable water from sea water, but, of course, the invention has uses in other fields for other purposes, and various changes and substitutions may be made in the particular apparatus or its arrangement without departing from the scope of the invention as defined in the following claims.

I claim:

1. Apparatus for condensing vapor on ice comprising a housing defining a vapor condensing chamber having a fluid discharge outlet, a plurality of spaced annular trays supported in said chamber for receiving a slurry of ice, each of said trays including a U-shaped channel defined by an outer wall, an inner wall and a bottom wall of the tray, means for distributing a slurry of ice to said trays, said distributing means including arcuate conduit means extending at least a portion of the way along said inner wall of each of said trays, means for flowing a slurry of ice from said conduit means into said trays to distribute the slurry of ice throughout said channels, means for removing fluid from said trays and for discharging fluid through said outlet, and means for flowing vapor in contact with said slurry of ice carried by said trays to condense the vapor and melt ice.

2. The apparatus of claim 1 wherein said trays are stacked and spaced trays.

3. The apparatus of claim 2 wherein each of said trays is an upwardly facing U-shaped tray defining a channel having an open upper side.

4. The apparatus of claim 3 wherein said trays are spaced from the walls of the said housing.

5. The apparatus of claim 3 wherein said means for flowing vapor in contact with said ice carried by said trays flows said vapor downwardly in contact with said ice.

6. The apparatus of claim 1 wherein each of the trays has at least one aperture therein for drainage of fluid condensate of said vapor therefrom.

7. The apparatus of claim 3 wherein one of the side walls of each of said trays has at least one aperture therein for draining of fluid condensate of said vapor from said tray.

8. The apparatus of claim 7 wherein said one of the side walls is the side wall adjacent the outer wall of said housing.

9. The apparatus of claim 7 wherein said side wall includes a plurality of said drainage apertures.

10. The apparatus of claim 1 wherein said means for flowing said slurry of ice from said conduit means into each of said trays includes a plurality of spaced notches in said conduit means for directing said slurry at an angle transversely into the channel defined by the tray to thereby distribute said ice.

11. The apparatus of claim 10 wherein said conduit means are held to said inner wall by removable clip means.

12. The apparatus of claim 1 wherein said conduit means each comprises two conduit sections, each section extending half way around the inner wall of the corresponding tray.

13. Apparatus for condensing vapor on ice comprising a vapor condensing chamber having a fluid discharge outlet, a plurality of spaced open top trays supported in said chamber for receiving and distributing a slurry of ice in said chamber, conduit means for supplying a slurry of ice individually to each of said trays, means for flowing vapor in contact with the slurry of ice carried by said trays to condense the vapor and melt ice, and means for removing fluid from said trays for discharge through said outlet.

14. The apparatus of claim 13 wherein said chamber is an annular chamber, each of said trays is an annular tray, and said means for flowing vapor in contact with said ice is located in said chamber to direct said vapor downwardly in contact with ice carried by all of said trays.

15. The apparatus of claim 13 including means for controlling the temperature of the condensing chamber.

16. The apparatus of claim 13 wherein said vapor is water vapor, and said ice is ice of water.

References Cited by the Examiner

UNITED STATES PATENTS

| | | | |
|---|---|---|---|
| 428,670 | 5/90 | Ferrell | 126—343.5 |
| 557,976 | 4/96 | Craig | 126—343.5 X |
| 977,109 | 11/10 | Lux | 126—343.5 X |
| 2,558,222 | 6/51 | Parkinson | 261—114 X |
| 2,716,024 | 8/55 | Dice | 261—114 X |
| 3,103,792 | 9/63 | Davids | 62—67 X |
| 3,121,626 | 2/64 | Zarchin | 62—124 X |

OTHER REFERENCES

Klencke: German application 1,125,405, printed, March 1962, (K39801 IVc/12a).

JAMES W. WESTHAVER, *Primary Examiner.*